Sept. 5, 1972  J. F. JUMER  3,689,387
METHOD FOR ELECTROPOLISHING SPARK GAP MACHINED PARTS
Filed Oct. 22, 1969

United States Patent Office 3,689,387
Patented Sept. 5, 1972

3,689,387
METHOD FOR ELECTROPOLISHING SPARK GAP MACHINED PARTS
John F. Jumer, 16 W. 131 Timber Trails Drive, Elmhurst, Ill. 60126
Filed Oct. 22, 1969, Ser. No. 868,513
Int. Cl. C23b 3/06
U.S. Cl. 204—140.5                  6 Claims

ABSTRACT OF THE DISCLOSURE

Surfaces of metal parts are machined and finished by a combination of electric discharge machining (EDM) followed by electropolishing with formation of a gaseous film over the surface being finished and carrying out the electropolishing at a voltage in excess of the critical voltage or nadir dip point voltage in the current density/voltage curve. The active surface of the cathode used should be shaped and dimensioned to conform to the final finish desired while allowing for adequate spacing between the active surface and piece part surface undergoing polishing to accommodate the electrolyte solution. The electropolishing treatment serves to completely or adequately remove the objectionable surface layer which is characteristic of electric discharge machining and leave the finished surface substantially free of peaks, crevices, and recast material and eliminates the need for tempering or annealing.

---

The so-called electric discharge machining (EDM) technique is well known and has been extensively used. A number of technical papers have been written referring to this highly useful technique. Typically they point out the shortcomings and disadvantages of the technique stemming from the characteristic recast surface and underlying heat-affected zone of such surfaces. Authorities on the EDM technique suggest certain procedures to minimize the degree to which the highly stressed hard surface layer is formed and offer suggestions as to how this layer may be eliminated. The method of eliminating or substantially removing the layer, heretofore suggested, involves a mechanical treatment such as lapping or grinding to remove the rehardened zone followed by retempering or annealing to minimize stress conditions, with the tempering or annealing being carried out at the highest temperatures permitted. (See, Die and Stamping News, August 1964, pp. 12–15; Metalworking News, Apr. 22, 1968, p. 22; Modern Machine Shop, June 1968, pp. 124–126.) However, even when the EDM operation is carefully carried out and is followed by a mechanical operation such as lapping or grinding to substantially remove the recast and rehardened zone, the results are often unsatisfactory in that the work pieces involved still have residual peaks or valleys which are sites of maximum fiber stresses and constitute defects which give rise to failures. Furthermore, the micro-finish on the parts tends to be inferior.

The object of the present invention, generally stated, is a combined EDM-electropolishing method of finishing the surfaces of metal parts which is easily and economically carried out on a production basis and which leaves the part with an excellent micro-finish and at least substantially free from recast surface areas or heat affected zones characteristic of EDM parts, as well as being free from peaks and valleys which act as stress raisers.

An important object of the invention is the provision of a combined EDM-electropolishing method of finishing metal parts wherein the surface finish of the part is left in an excellent condition without re-annealing, re-tempering or follow-up mechanical finishing being required.

A further object is the provision of a combined EDM-electropolishing method of the class described which is adapted for use in tool and die shops, and in the automotive and aerospace fields.

Still another object of the invention is the provision of a combined EDM-electropolishing method of the class described which is particularly useful in connection with very hard and exotic metals and with odd and complicated shapes.

Certain other objects of the invention will in part be obvious and will in part appear hereinafter.

Figure 4:
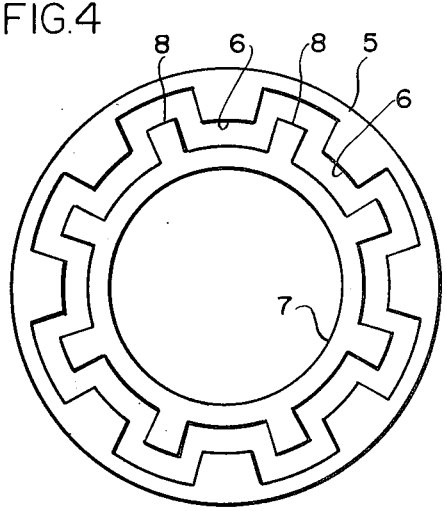
Figure 1:
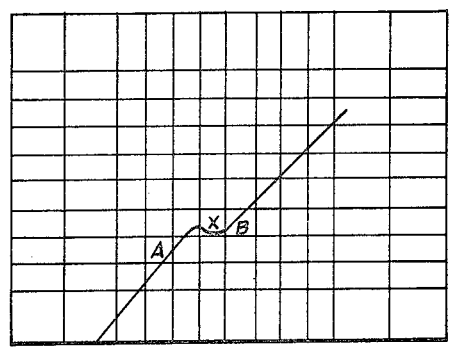
Figure 2:
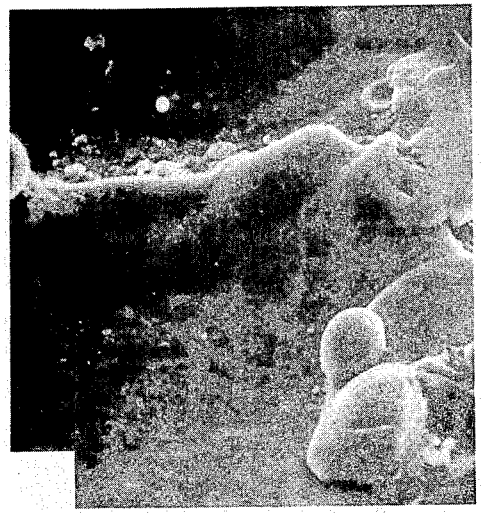
Figure 3:
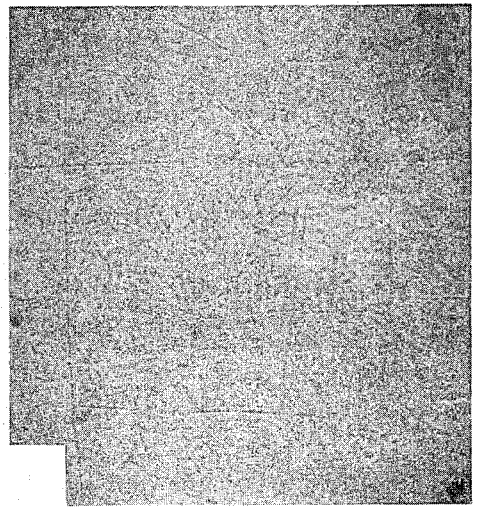

For a more complete understanding of the nature and scope of the invention reference may now be had to the following detailed description thereof taken in connection with the accompanying drawing wherein:

FIG. 1 is a typical Current Density Voltage curve encountered in electropolishing operations;

FIGS. 2 and 3 are photomicrographs of a tool steel surface area after EDM treatment thereof, and after electropolishing treatment, respectively, in accordance with the present invention; and FIG. 4 is a cross-sectional view of a female splined hollow shaft and an exteriorly ribbed cathode set-up, for electropolishing the shaft interior as will be described in the working example hereinafter set forth.

While the present invention is useful in connection with metals generally it presently has wide application in connection with ferrous metals and metal parts and particularly parts in work pieces of the type with which EDM treatment is presently widely used, e.g., tools and dies having intricate and/or odd-shaped surfaces and contours.

With respect to any particular work piece or part which is to have all or a portion of its surface machined and finished in accordance with the present invention, the surfaces involved are first subjected to EDM treatment using known commercial equipment and techniques and desirably following known procedures to minimize the degree to which a highly stressed and hard recast surface layer is formed. Following the EDM treatment the surfaces involved are electropolished using known equipment but in a particular manner in order to obtain the desired results. In carrying out the electropolishing treatment the following conditions or requirements are included or practiced: (1) an electropolishing solution is utilized under proper conditions to form and maintain a gaseous film over the surface; (2) a voltage is used which is in excess of the critical voltage or nadir dip point voltage; and, (3) the current is flowing both when the metal part is introduced into the electropolishing solution and when removed therefrom.

The following working example will serve to specifically illustrate typical commercial applications of the present invention and suggest others to those skilled in the art.

EXAMPLE

Referring to FIG. 4 of the drawing, a steel hollow shaft for a helicopter rotor with female splines 6—6 is shown the complete interior surface of which has been machined by EDM and left with the typical recast surface replete with irregularities such as projections, knobs, peaks, cracks, crevices, craters, etc. A cathode 7 carrying exterior ribs 8—8 is co-axially mounted within the shaft 5.

This set-up is such that the closest distance between any point on the exterior surface of the cathode 7, including the exteriors of the ribs 8—8, to the opposing interior surface of the shaft 5, including the splines 6—6, is approximately the same. The splines 6 had a radial length of ¼" and the diametric spacing between the crests of opposing splines was 2½". The interior of the female splined shaft 5 had been machined by EDM and it was desired to remove 0.004" of material from the interior or bore surface, remove the recast material, and leave a good interior finish. The outer diameter of the copper cathode 7 and the spacing and exterior dimensions of the copper ribs or strips 8—8 were such that the distance or spacing between any point on the exterior of the cathode 7, including any point on the strips 8—8, to the closest opposing point on the interior of the splined rotor shaft 5 was approximately 3/16".

The electrolyte bath or electropolishing solution used consisted of 85% strength, technical grade $H_3PO_4$ containing 16 ounces by weight of commercial grade chromic acid flakes per gallon of phosphoric acid. The solution was pumped through annular space between the cathode 7 and the interior of the shaft 5 at the rate of 4–5 gallons per minute. The nadir dip point voltage or critical voltage was 6 volts and the current density was 10 amperes per square inch. Under these conditions it required 15 minutes to remove the desired 0.004" of metal from the interior of the shaft 5.

In carrying out the foregoing example the appropriate voltage or range of voltage to be used in the electropolishing operation is conveniently determined by employing the appropriate current density voltage curve. Such curves are known for a number of electropolishing solutions and may be readily determined by known techniques for other solutions. A typical current density voltage curve is shown in FIG. 1.

During electropolishing, an oxide (or hydroxide) film is formed by electrolytic oxidation at the anode (the hollow shaft 5 in FIG. 4). This anodic film is apparently filled with minute gas bubbles and uniformly covers the metal surface being polished and is believed responsible for micropolishing. The exterior portion of the film is constantly dissolving into the electrolyte. Suitable conditions are established, during electropolishing, to maintain a constant anodic film thickness, or an equilibrium between oxide formation on one side and the rate of chemical dissolution into the electrolyte on the other. By proper circulation of the electrolyte solution, the composition of the anodic film is maintained substantially uniform and filled with fine gas bubbles as distinguished from large bubbles which cause streaking.

As an alternative to circulation of the electrolyte solution as a means of obtaining adequate agitation to promote uniformity of the solution and prevent gas streaking, the metal part itself may be vibrated or agitated thereby agitating the anodic film covering the surface to be electropolished.

A visual illustration and conception of the results that may be achieved in practicing the present invention may be readily gained by reference to FIGS. 2 and 3. FIG. 2 is a photomicrograph at 2000 magnification of a representative area of a piece of tool steel which has been subjected to EDM treatment. The characteristic recast, hardened surface is apparent being filled with sharp peaks and valleys, craters and a variety of odd and irregular shaped deposits.

FIG. 3 is a photomicrograph, also at 2000 magnification of the same area as FIG. 2, after it has been electropolished in accordance with the present invention. The finish for the area shown in FIG. 3 is typical of an excellent microfinish such as is obtained in the electropolishing of metal parts.

The following table will serve to quantitatively illustrate the improvements and results which can be readily obtained in electropolishing the electric discharge machined surfaces of 1020 tool steel in accordance with the present invention.

Any desired part of the surface of a metal part may be shielded from electropolishing action by masking it off such as by covering with a non-conductive coating.

TABLE I

| Operation No.: | Stock removed (inch) | Micro finish (root mean square) | |
| --- | --- | --- | --- |
| | | Before | After |
| 1 | −.0035 | 250–400 | 100–125 |
| 2 | −.0025 | 225–350 | 150–200 |
| 3 | −.0025 | 225–325 | 100–150 |
| 4 | −.0030 | 250–300 | 125–150 |
| 5 | −.0028 | 225–275 | 125–150 |
| 6 | −.0015 | 175–225 | 125–150 |
| 7 | −.0012 | 175–225 | 125–150 |
| 8 | −.0015 | 175–225 | 125–175 |
| 9 | −.0017 | 200–225 | 125–150 |
| 10 | −.0015 | 225–280 | 150–200 |

I claim:

1. In finishing a surface of a metal part which surface has been electric discharge machined the improvement which comprises, electropolishing said surface in an electrolyte solution at a voltage in excess of the critical voltage of the voltage current density curve for said solution while maintaining a gaseous film over said surface, and maintaining a flow of electric current both when said surface is introduced into and removed from said solution, the active surface of the cathode used in electropolishing being shaped and disposed so that each point on said active surface is approximately the same distance from the nearest point on said electric discharge machine surface, and said electropolishing action being sufficient to remove substantially all of the recast deposit and underlying heat affected zone from said electric discharge machined surface to substantially improve the finish on said surface.

2. The improvement of claim 1 wherein a layer at least about 0.00015" is removed from said surface by electropolishing.

3. The improvement of claim 1 wherein said metal part is formed of steel.

4. The improvement of claim 1 wherein said electrolyte solution is agitated to prevent gas streaking and promote uniformity of said electrolyte solution.

5. The improvement of claim 1 wherein said electric discharge machined surface is agitated to prevent gas streaking and promote uniformity of said electrolyte solution.

6. The improvement of claim 1 wherein during said electropolishing treatment a desired portion of said metal part is masked so as not to subject to said treatment.

References Cited

UNITED STATES PATENTS

| | | | |
| --- | --- | --- | --- |
| 2,665,247 | 1/1954 | Jumer | 204—140.5 |
| 3,326,785 | 6/1967 | Williams | 204—140.5 |
| 3,553,415 | 1/1971 | Girard | 204—143 M |

FOREIGN PATENTS

| | | | |
| --- | --- | --- | --- |
| 704,945 | 3/1954 | Great Britain | 204—140.5 |

OTHER REFERENCES

Electrolytic Polishing by J. S. Crout Metal Industry, June 8, 1945, pps. 357—359.

The Anodic Polishing of Electroplated Nickel by A. W. Hothersall et al. J. Elect. Tech. Soc., 1940 (16) pps. 83–90.

The Electrolytic Polishing of Metals by S. Wernick, J. Elect. Tech. Soc., 1943 (18) pps. 103–109.

JOHN H. MACK, Primary Examiner

T. TUFARIELLO, Assistant Examiner